United States Patent

[11] 3,529,550

| [72] | Inventor | Ralph W. Snowden<br>Gurley, Alabama |
|---|---|---|
| [21] | Appl. No. | 709,646 |
| [22] | Filed | March 1, 1968 |
| [45] | Patented | Sept. 22, 1970 |
| [73] | Assignee | Thiokol Chemical Corporation<br>Bristol, Pennsylvania<br>a corporation of Delaware |

[54] ONE POINT STAR GRAIN CONFIGURATION FOR SOLID PROPELLANT ROCKET MOTORS
5 Claims, 13 Drawing Figs.

[52] U.S. Cl. ................................................... 102/99
[51] Int. Cl. ..................................................... F42b 1/02
[50] Field of Search........................................... 102/99,
100, 101, 102, 103, 104, 49.3—49.7

[56] References Cited
UNITED STATES PATENTS

| 2,933,041 | 4/1960 | Ambrose........................ | 102/99X |
| 3,164,093 | 1/1965 | Holzman et al................ | 102/99 |
| 3,188,802 | 6/1965 | Davis............................. | 102/103X |
| 3,201,936 | 7/1965 | Bangelin........................ | 102/100X |
| 3,256,819 | 6/1966 | Leeper.......................... | 102/100 |

Primary Examiner—Robert F. Stahl
Attorney—Thomas W. Brennan

ABSTRACT: A solid propellant grain having a one point box hook-shaped configuration therein, that by the shape of the configuration within the solid propellant grain will control the trace shape, increase the loading density and reduce the strains encountered by the solid propellant grain, during temperature changes.

Ralph W. Snowden INVENTOR.

BY

ATTORNEY

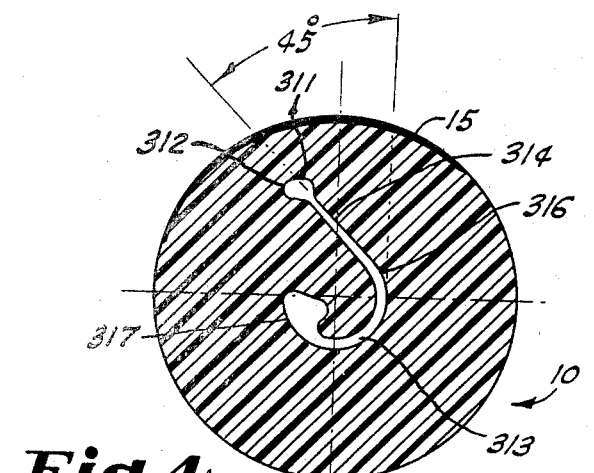
Fig. 4.
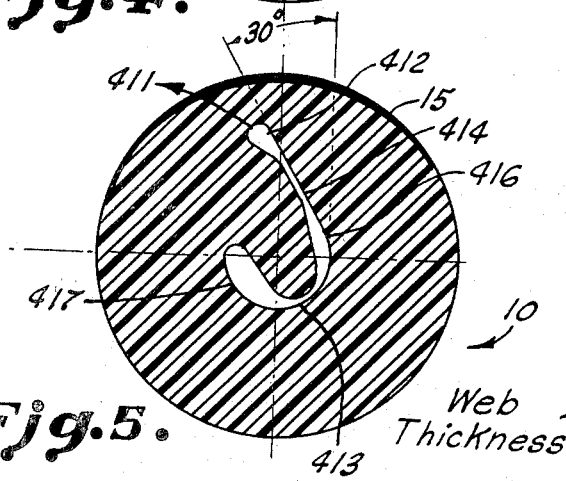
Fig. 5.
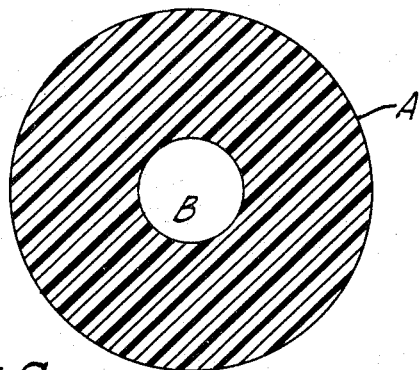
Fig. 6.
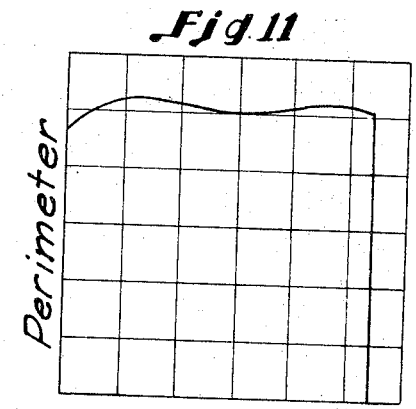
Fig. 11
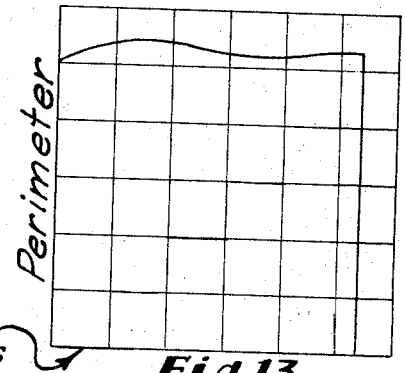
Fig. 12
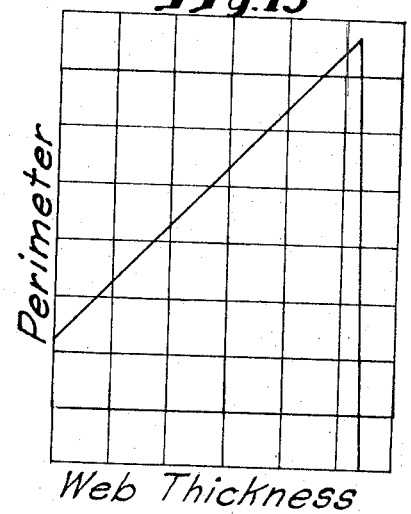
Fig. 13
Ralph W. Snowden INVENTOR.
ATTORNEY

ONE POINT STAR GRAIN CONFIGURATION FOR SOLID PROPELLANT ROCKET MOTORS

BACKGROUND OF THE INVENTION

1. Field of the Invention

It is a well-known fact that solid propellant rocket motors utilize a thin-wall cylindrical rocket motor case, that is closed at one end and has at the other end a nozzle for the emission of exhaust gases from the rocket motor case. A case-bonded solid propellant may be cast into the rocket motor case after a core of fixed configuration has been placed in the rocket motor case, with the solid propellant grain filling the space between the core and the rocket motor case, after which the solid propellant grain is cured and the core is then removed, leaving therein a cavity that duplicates the exterior contour of the core.

The core usually possesses a plurality of star points that are arranged symmetrically with relation to the longitudinal axis of the core and the number of star points are varied according to the individual requirement of the particular solid propellant rocket motor that is involved.

It is apparent, therefore, that it is the altering or changing of the number of star points on a conventional core prior to the positioning of the core in the rocket motor case that will vary the relationship of the cavity to the rocket motor case, but it is the shape of the box hook-shaped core that is utilized in the instant invention that, without adding additional star points, will provide many variations in the characteristics of the solid propellant grain to meet specific requirements of the solid propellant rocket motor, as will occur when the number of star points are varied as to number as in conventional practice.

2. Description of the Prior Art

As has been previously stated, the cavity configuration in the solid propellant grain has, in the past, been varied by altering, changing and increasing or decreasing the number of star points on a core before it is positioned in the rocket motor case.

Thus, it is the number of star points on the core that will affect the resultant manner of operation of the solid propellant rocket motor. However, in the instant invention, it is the shape of the box hook-shaped core with the use of only one point that will vary the manner of operation of the solid propellant rocket motor to control the trace shape, increase the loading density and reduce the strains on the solid propellant grain that are encountered by the solid propellant rocket motor under temperature changes that occur during its operational requirements.

SUMMARY OF THE INVENTION

This invention pertains, therefore, to a solid propellant grain configuration that, by the shape of the core, which utilizes only one point to form such configuration, will impart improved operating characteristics to the solid propellant rocket motor in which it is cast.

It is also conventional practice to provide a cylindrical perforation grain of fixed configuration for all solid propellant rocket motors.

Thus, the central cavity providing such configuration, has been formed by placing a core having a specific number of star points within a rocket motor case or by utilizing a core that possesses a common cylindrical configuration with no star points.

Where a box hook-shaped core configuration is utilized, as in the instant invention, and is positioned in the rocket motor case before the solid propellant is cast into the rocket motor case, the solid propellant grain that is adjacent to the interior wall of the rocket motor case is known as the web, and can be varied to change the manner of operation of the solid propellant rocket motor, due to the manner in which the box hook-shaped core is shaped and positioned. It is noted, therefore, that the ratio of the thickness of the web, as previously set forth, to the radius of the solid propellant grain, is commonly referred to as the web fraction.

In a solid propellant rocket motor, the solid propellant grain possesses internal burning and with the external surface of the solid propellant grain bonded to the internal wall of the rocket motor case by means of some form of liner, the shape of the internal cavity will determine the burning surface of the solid propellant grain.

The configuration of the solid propellant grain will, therefore, establish a predetermined relationship between the initial and final burning surfaces of the solid propellant grain with the final burning surface being the surface at the instant the web burns through.

It became apparent, therefore, that there was a need for a solid propellant configuration design that would consider the web thickness, so that a loading density of 0.90 to 0.98 percent could be realized, while at the same time permit that a progressive or regressive trace pattern be achieved, controlled by the burning characteristics of the solid propellant grain which is the result of the particular web fraction that is employed to reduce the strain on the solid propellant grain.

It is also a well-known fact that a high ratio of thrust to mass is important for solid propellant rocket motors and it is important that the solid propellant grain surrounding the cavity be completely consumed before the web burns through to leave unburned slivers of the solid propellant grain, which usually results in an undesirable large fraction of the solid propellant grain remaining unburned, and if the cavity is too large, useful space, that could have been filled with the solid propellant grain, is wasted.

When a solid propellant grain having a configuration, as envisioned by the instant invention, is utilized, many difficulties that are encountered by a configuration utilizing a plurality of star points are avoided. By the use of the solid propellant grain configuration embodying the invention, high loading density is achieved with a minimum size cavity, nominal web fraction and the elimination of a low sliver loss, which combination of advantages provides a solid propellant rocket motor that is capable of providing a high ratio of thrust to mass which also provides a practical ratio of length to diameter.

Thus, by the use of a box hook-shaped configuration which may be shaped and positioned to vary the web, slivers will be eliminated and strains to the solid propellant grain, occasioned by temperature changes, will be distributed over a much wider area, to lessen the chance of cracking of the solid propellant grain and subsequent rupture of the rocket motor case during operation of the solid propellant rocket motor as the result of inadvertent increase in the burning surface of the solid propellant grain and premature burning through of the web. Thus, by changing the specific design of the box hook-shaped core, the completion of the burning area of the solid propellant grain will achieve the same time interval as is required to burn through the web.

The configuration of the box hook-shaped cavity is so proportioned in some instances, in relation to the web thickness, that the maximum width of the cavity is less than twice the thickness of the web, thus the solid propellant grain will be consumed in substantially less time than is required to burn through the web. Thus, a larger burning surface with high and substantially constant thrust is achieved during the burning of the solid propellant grain, which is naturally followed by a lower thrust during the burning of the remainder of the web. Thus a solid propellant rocket motor is achieved that possesses rapid acceleration to cruise velocity after which a lower level of thrust is required to maintain velocity against aerodynamic drag.

It is clearly apparent, therefore, that the main object of the invention is to provide a solid propellant grain that, by its unusual configuration, will control the trace shape, as well as increase the loading density and reduce the strains encountered by the solid propellant grain when incorporated into the rocket motor case of a solid propellant rocket motor.

With the above and other objects and advantages in view, that will appear to one skilled in the art, it is believed that a complete understanding of the invention will be achieved as

BRIEF DESCRIPTION OF THE DRAWINGS

FIG. 4 is a view similar to FIG. 1 of a fourth form of configuration, and in FIG. 11 the supporting graph therefor;

FIG. 5 is a view similar to FIG. 1 of a fifth form of configuration and in FIG. 12 the supporting graph therefor;

FIG. 6 is a transverse sectional view of a conventional circular perforated form of configuration and in FIG. 13 a graph illustrating the trace shape for this form of configuration.

DESCRIPTION OF THE PREFERRED EMBODIMENTS

Figure 1:
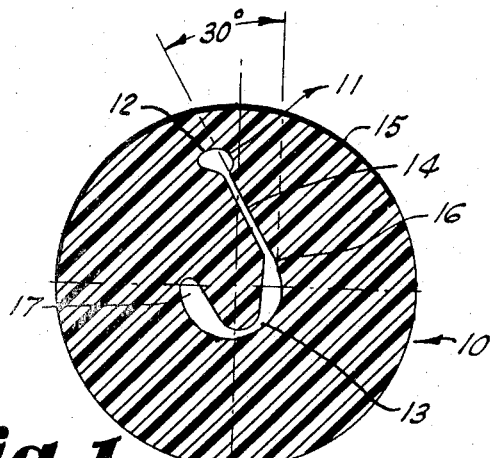
FIG. 1 is a transverse sectional view of one form of configuration embodying the invention, and in FIG. 8 a graph illustrating the trace shape for this form of configuration, according to the web thickness of the configuration.

Referring more in detail to the drawings, wherein like parts are designated by like reference numerals, the reference numeral 10 is used in FIGS. 1 to 5 inclusive, to designate a solid propellant grain, which may be varied in configuration as will be later described for these FIGS.

In FIG. 1 a box hook-shaped cavity 11 is shown that utilizes a bulbous end 12, a curved hook formation 13, and a shank 14 joining the end 12 and the curved hook formation 13 into a unitary configuration of a box hook-shaped formation.

To illustrate the invention, in FIGS. 1 to 5 inclusive, the reference numeral 10 is used to depict the solid propellant grain. In FIG. 1, the axis of the shank 14 is shown as extending at an angle of 30° from the extreme right end 16 of the periphery of the curved hook formation 13, thus, any angular displacement or change of the axis of the shank 14 that creates a different design for the box hook-shaped cavity, would govern the operation of the solid propellant rocket motor in which the solid propellant grain has been cast. In all of the FIGS., the web of the solid propellant grain 10 is the distance between the bulbous portion of the box hook-shaped cavity and the circumference or perimeter of the solid propellant grain 10, and the outer surface of the solid propellant grain 10, in an area adjacent and circumjacent to the web of the solid propellant grain 10, has a liner 15 applied thereto, that prevents excessive heating and subsequent burnout of the motor case, not shown, into which the solid propellant grain 10 has been cast or will be cast.

Figure 2:
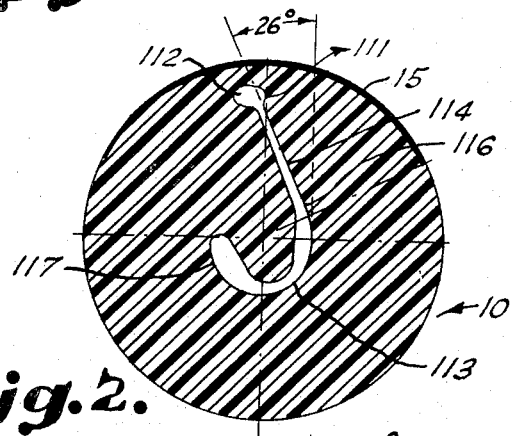
FIG. 2 is a view similar to FIG. 1 of a second form of configuration, and in FIG. 9 the supporting graph therefor.

In FIG. 2 a box hook-shaped cavity 111 is shown and the box hook-shaped cavity 111 also utilizes a bulbous end 112, a curved hook formation 113, and a shank 114 joining the end 112 and the curved hook formation 113 into a unitary configuration of a box hook-shaped formation. But in this FIG. the shank 114 extends at an angle of 26° from the extreme right end 116 of the curved hook formation 113.

Figure 3:
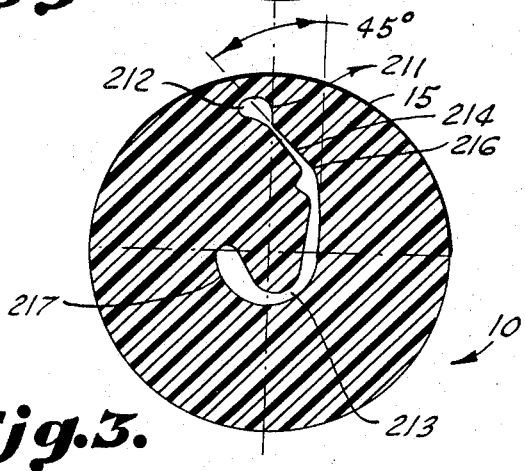
FIG. 3 is a view similar to FIG. 1 of a third form of configuration, and in FIG. 10 the supporting graph therefor.
Figure 8:
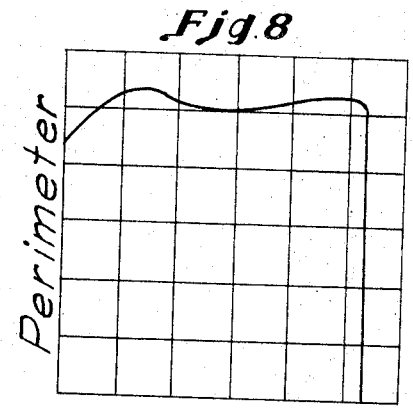
Figure 9:
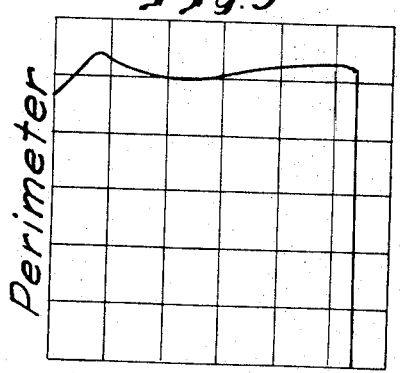
Figure 10:
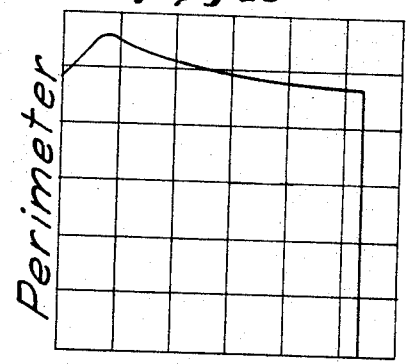

In FIG. 3 a box hook-shaped cavity 211 is shown and the box hook-shaped cavity 211 also utilizes a bulbous end 212, a curved hook formation 213, and a shank 214. In this instance, however, the curved hook formation 213 differs from the curved hook formations 13 and 113 of FIGS. 1 and 2 in that the curved hook formation 213 has a right extreme end that terminates at a point 216 which is elongated in relation to the curved portion of the curved hook formation 213 and the shank 214 extends at an angle of 45° from the point 216 to join the end 212 and the curved hook formation 213 into a unitary configuration of a box hook-shaped formation.

In FIG. 4 a box hook-shaped cavity 311 of somewhat different configuration is shown, and while the box hook-shaped cavity 311 also utilizes a bulbous end 312, a curved hook formation 313 and a shank 314 joining the end 312 and the extreme right end 316 of the curved hook formation 313 into a unitary configuration of a box hook-shaped formation with the shank 314 extending at an angle of 45° from the end 316 of the curved hook formation 313. The extreme left end 317 of the curved hook formation 313, however, differs slightly in shape from the extreme left ends of 17, 117 and 217 of the curved hook formations 13, 113 and 213 shown in FIGS. 1, 2 and 3.

In FIG. 5 a box hook-shaped cavity 411 is shown and while the box hook-shaped cavity 411 also utilizes a bulbous end 412, it differs slightly from the bulbous ends 12, 112, 212 and 312 of FIGS. 1, 2, 3 and 4. The box hook-shaped cavity 411 also utilizes a curved hook formation 413 and a shank 414, that joins the end 412 and the extreme right end 416 of the curved hook formation 413 into a unitary configuration of a box hook-shaped formation. The extreme left end 417 of the curved hook formation 413 differing only slightly from the extreme left ends 17, 117 and 217, as shown in FIGS. 1, 2 and 3.

In FIG. 6 a conventional solid propellant grain A is shown to include a conventional circular perforated configuration B and is shown only to illustrate any differences that might exist between this type of solid propellant grain and the solid propellant utilizing the configuration embodying the invention.

In the graphs shown in FIGS. 8 to 12 inclusive, the web fraction, as previously described, remains the same 0.725, even though the shank 14 extends at an angle of 30° from the extreme right end 16 of the curved hook formation 13, the shank 114 extends at an angle of 26° from the extreme right end 116 of the curved hook formation 113, the shank 214 extends at an angle of 45° from the extreme right end 216 of the curved hook formation 213, the shank 314 extends at an angle of 45° from the extreme right end 316 of the curved hook formation 313 and the shank 414 extends at an angle of 30° from the extreme right end 416 of the curved hook formation 413. It is apparent, therefore, that regardless of the angular relation of the shanks to the curved hook formations, the web fraction will remain the same in all the box hook-shaped configurations shown in FIGS. 1 to 5 inclusive.

The perimeters in all of the FIGS. may remain the same or may vary according to the size of the solid propellant grain 10.

The solid propellant grain A of FIG. 6 will also have the same web fraction 0.725 as the web fractions of the box hook-shaped configurations shown in FIGS. 1 to 5 inclusive, but a comparison of the graphs shown in FIGS. 8 to 13 illustrate the different types of trace shapes that are achieved by the different configurations and it should be apparent to one skilled in the art the advantages in trace shape that the box hook-shaped configurations embodying the invention, possesses over the conventional configurations shown in FIG. 6.

Thus, as pointed out, the box hook-shaped configurations permit high loading density, progressive or regressive traces to be achieved and will also permit a choice of web fractions to reduce the strains created by temperature changes in the solid propellant grain, even though in the illustrations utilized to depict the solid propellant grain configurations embodying the invention, a constant web fraction is maintained.

The box hook-shaped solid propellant grain configurations shown in FIGS. 1 to 5 inclusive, are limited in cross sectional loading density only by the port area in the configurations formed by the curved hook formations to the throat ratio of the nozzle of the solid propellant rocket motor or by the Mach number of the combustion products. When compared to a conventional cylindrical perforation propellant grain, as shown in FIG. 6, which is strain limited, the box hook-shaped configuration permits a substantial increase of cross sectional loading density over the straight cylindrical perforated propellant grain configuration with the same total induced thermal and pressurization strains. In order to achieve a moderately level, progressive, or regressive trace and reduce the Mach number at the aft end of a cylindrical perforated configuration, either longitudinal or machined slots, or fins, are added to cylindrical perforated configurations. The addition of longitudinal slots complicates the cylindrical perforated configuration and results in strain relieving transition areas which are formed by break-away additions to the basic core.

The box hook-shaped propellant grain configuration permits a higher cross sectional loading density in the forward end of the motor and since the single point in the box hook-shaped configurations can be varied as to angular relationships between the shanks and the curved hook formations to maintain a low Mach number without a strain relieving zone, a straight pull core, designed to meet configuration requirements, can be used without break-away additions being needed. This can result in a net gain from 4 to 6 percent in volumetric loading density in a typical motor.

The box hook-shaped propellant grain configuration requires less insulation for the single slot or shank than is required for a multiple slot cylindrical perforation configuration, which can contribute to a net gain of an additional 4 to 6 percent in propellant weight or volumetric density.

Figure 7:
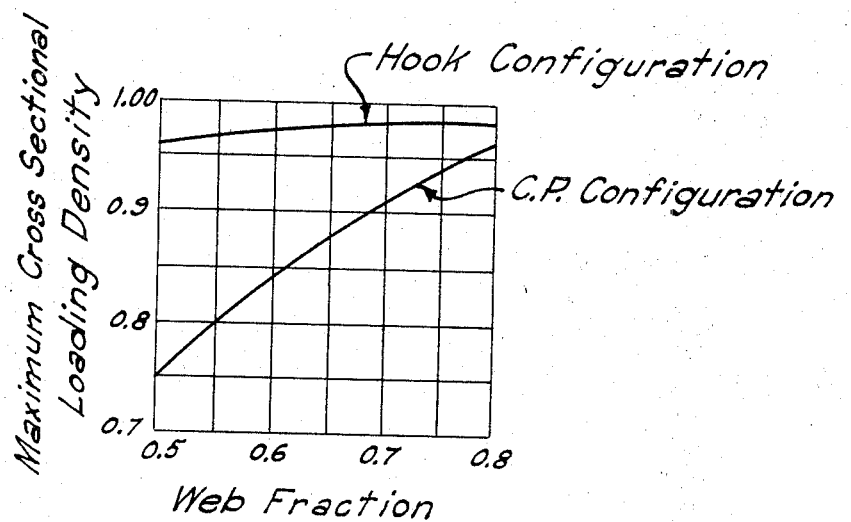
FIG. 7 is a graph illustrating the differences that exist between a solid propellant grain having a box hook-shaped configuration and a solid propellant grain having a conventional circular perforated configuration.

In the graph of FIG. 7, the ratio of the loading density of the box hook-shaped propellant grain configuration is compared with the loading density of the cylindrical perforation configuration and the graph depicts the ratio involved when the web fraction remains constant in all of the variations illustrated.

It has been found during casting of the box hook-shaped propellant grain, that the trace shape of the solid propellant rocket motor, into which the box hook-shaped propellant grain has been cast, can be varied by an angular relationship between the shanks and the curved hook formations so that the positions of the bulbous ends of the box hook-shaped cavities can be varied, and the distances between the motor case and the bulbous ends and the curved hook formations are varied and also if the dimensions of the curved hook formations are varied. It is to be noted that the trace shape can be controlled by varying the port areas of the box hook-shaped configurations. Also that the strains which are applied to the solid propellant grain can be controlled and determined by the variation of the curved hook formations. The most important advantage of the box hook-shaped solid propellant grain configuration is the fact that no slivers remain as an unburned residue during the operation of the solid propellant rocket motor utilizing the box hook-shaped solid propellant grain configuration.

It is believed that from the foregoing description, the advantages that are obtained by the use of the box hook-shaped solid propellant grain configuration, as well as the manner of use and mode of operation will be apparent to one skilled in the art.

I claim:

1. A cylindrical-shaped solid propellant grain having in cross-section a box hook-shaped cavity therein formed with only one point and extending throughout the length of said grain, said cavity having a shank portion and a curved hook formation contiguous with one end of said shank portion.

2. A cylindrical-shaped solid propellant grain as in claim 1 wherein the box hook-shaped configuration has a bulbous portion at the end of the shank opposite to the end thereof having the curved hook formation thereon and the shank joins said bulbous portion and such curved hook formation into a unitary cavity formation.

3. A cylindrical-shaped solid propellant grain as in claim 1 wherein the shank portion extends at an angle of 26 to 45° from the curved hook-shaped portion at its point of congruousness with said shank portion.

4. A cylindrical-shaped solid propellant grain as in claim 2 wherein the position of said bulbous portion with relation to the circumference of said grain determines the web thickness of said grain.

5. A cylindrical-shaped solid propellant grain as in claim 2 wherein a liner is bonded to the circumference of said grain adjacent to and in circumjacent relation to the bulbous portion of said box hook-shaped cavity.